(12) United States Patent
Sundholm (10) Patent No.: US 9,555,965 B2
(45) Date of Patent: Jan. 31, 2017

(54) METHOD AND APPARATUS FOR FEEDING MATERIAL INTO A ROTARY SHAPER DEVICE

(71) Applicant: MARICAP OY, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 0 days.

(21) Appl. No.: 14/399,269

(22) PCT Filed: Apr. 26, 2013

(86) PCT No.: PCT/FI2013/050473
§ 371 (c)(1),
(2) Date: Nov. 6, 2014

(87) PCT Pub. No.: WO2013/167798
PCT Pub. Date: Nov. 14, 2013

(65) Prior Publication Data
US 2015/0117965 A1    Apr. 30, 2015

(30) Foreign Application Priority Data

May 7, 2012  (FI) ..................................... 20125491
Aug. 16, 2012  (FI) ..................................... 20125849

(51) Int. Cl.
*B65G 53/66* (2006.01)
*B65F 5/00* (2006.01)
*B65G 51/02* (2006.01)

(52) U.S. Cl.
CPC ............... *B65F 5/005* (2013.01); *B65G 51/02* (2013.01)

(58) Field of Classification Search
CPC .................................. B65F 5/005; B65G 51/02
USPC ............................................................ 406/50
See application file for complete search history.

(56) References Cited

U.S. PATENT DOCUMENTS

| 2,707,594 | A | * | 5/1955 | Moore ...................... B02C 9/00 |
|---|---|---|---|---|
| | | | | 241/152.1 |
| 3,933,393 | A | * | 1/1976 | De Feudis .............. B65F 5/005 |
| | | | | 406/130 |
| 3,948,167 | A | | 4/1976 | De Feudis |
| 5,393,138 | A | * | 2/1995 | Federhen ................ B01F 7/048 |
| | | | | 366/307 |

(Continued)

FOREIGN PATENT DOCUMENTS

| FI | 122105 B | 8/2011 |
|---|---|---|
| JP | 54-79780 U | 6/1979 |

(Continued)

*Primary Examiner* — William R Harp
(74) *Attorney, Agent, or Firm* — Birch, Stewart, Kolasch & Birch, LLP (57) ABSTRACT

Method for feeding material into a rotary shaper device in a pneumatic pipe transport system for material, in which the material is conducted along a feeder channel to the rotary shaper device, in which case the material to be handled is conducted into the shaper device and/or through it by the aid of at least partly the suction and/or a pressure difference of the pneumatic pipe transport system. In the method the material is acted upon in the feeder channel, or in the channel leading into it, with at least one guide member, which is configured to reduce the undesirable rotation of the material in the feeder channel and/or to improve the access of replacement air into the rotary shaper. The invention also relates to an apparatus.

23 Claims, 8 Drawing Sheets

(56) References Cited

U.S. PATENT DOCUMENTS

2011/0013994 A1\* 1/2011 Sundholm ............ B65G 53/50
406/154

FOREIGN PATENT DOCUMENTS

| WO | WO 82/03200 A1 | 9/1982 |
|----|----------------|--------|
| WO | WO 03/057596 A1 | 7/2003 |
| WO | WO 2009/130374 A1 | 10/2009 |
| WO | WO 2010/029212 A1 | 3/2010 |
| WO | WO 2011/098666 A1 | 8/2011 |
| WO | WO 2011/098667 A2 | 8/2011 |
| WO | WO 2011/098668 A2 | 8/2011 |
| WO | WO 2011/098669 A2 | 8/2011 |

\* cited by examiner

METHOD AND APPARATUS FOR FEEDING MATERIAL INTO A ROTARY SHAPER DEVICE

BACKGROUND OF THE INVENTION

The invention relates generally to materials handling systems, such as partial-vacuum transporting systems, more particularly to the collection and conveying of wastes, such as to the conveying of household wastes.

Systems wherein wastes are conveyed in piping by means of an air current produced by a pressure difference or suction are known in the art. In these, wastes are conveyed long distances in the piping. It is typical to these systems that a partial-vacuum apparatus is used to achieve a pressure difference, in which apparatus a partial vacuum is achieved in the conveying pipe with partial-vacuum generators, such as with vacuum pumps or with an ejector apparatus. A conveying pipe typically comprises at least one valve means, by opening and closing which the replacement air coming into the conveying pipe is regulated. Input points at the input end of the material are used in the systems, from which input points the material, such as wastes, is conveyed into the system. The system can also comprise refuse chutes into which material, such as waste material, is fed and from which the material to be conveyed is conveyed into a conveying pipe by opening a discharge valve means, in which case, by means of the sucking effect achieved by the aid of the partial vacuum acting in the conveying pipe and also by means of the surrounding air pressure acting via the refuse chute, material such as e.g. waste material packed into bags, is conveyed from the refuse chute into the conveying pipe. The pneumatic waste conveying systems in question can be utilized particularly well in densely populated urban areas. These types of areas have tall buildings, in which the input of wastes into a pneumatic waste conveying system is performed via a refuse chute or other input point arranged in the building.

Wastes are conveyed pneumatically in a closed system to the reception station, in which the wastes are compressed with a press only after transportation. The pipes of a pneumatic conveying system are in normal cases rather large in diameter, e.g. in the region of 500 mm in their diameter.

Known from publication WO8203200 A1 is a device for fine-grinding, compressing and outputting a high-volume bulk good, more particularly household wastes, by means of which device the waste material conducted through the device can be compacted. In the solution according to the publication large output powers are typically needed, especially in situations in which the device is used to cut or fine-grind a material, in which case the energy consumption of the drive devices and the costs of the drive devices are high. In addition, the passage of stones or other corresponding material between the cutting blades can produce breakage of the blades. Further known from publications WO2011098666, WO2011098667, WO2011098668 and WO2011098669 are solutions in which rotary shapers are applied. Rotary shapers according to prior art comprise a number of rotatable handling means and typically a non-rotating handling means between them. These have proven to be effective for their purpose. In the feeder channel of rotary shapers the material being fed in can, in some cases, compact and, in some cases, try to rotate along with the rotational movement of the shaping means, possibly hampering effective infeeding of material into the rotary shaper from the feeder channel. Material that has compacted onto the feeder channel can, on the other hand, hinder the access of replacement air into the rotary shaper via the feeder channel.

The aim of the present invention is to achieve an entirely new type of solution in connection with waste feeder channels and rotary shapers, by means of which solution the drawbacks of prior art solutions are avoided.

BRIEF DESCRIPTION OF THE INVENTION

The invention is based on a concept wherein guide means extending from the wall of the channel inwards in the channel are arranged in the feeder channel, or in the channel leading into it, which guide means are configured to reduce the undesirable rotation of the material in the channel and/or to improve the access of replacement air into the rotary shaper.

The solution according to the invention has a number of important advantages. With the guide means according to the invention the undesirable rotation of material to be handled in the feeder channel of a rotary shaper can be prevented. With the guide means the passage of material in an input chute towards the input aperture can be boosted, in which case the capacity of the rotary shaper rises. By shaping and aligning the guide means, their operation can be enhanced and at the same time the undesirable adhesion of the infeeding material to the guide means can be prevented. By the aid of a guide means the passage of replacement air in the rotary shaper can be boosted. By arranging a channel for replacement air to the guide means, the passage of replacement air to the rotary shaper can be effectively ensured. By means of the invention, external replacement air piping can be avoided. At the same time e.g. the access of undesirable substances and liquids from separate replacement-air apertures to outside the rotary shaper can be prevented. By arranging an arresting means in the feeder channel, or in the channel leading into it, the infeed of material to be handled can additionally be adjusted in the feeder channel before the rotary shaper. In this case with the arresting means the weight effect produced by the material to be handled on the rotary shaper, more particularly the load transmitted to its handling means, can be prevented or at least reduced. In this case the power requirement of the rotary shaper is smaller. In addition, the susceptibility to clogging decreases. With the arresting means the infeed of material in the feeder channel can also be improved. This is an effective solution particularly for large quantities of waste and for heavy waste sacks.

By means of the invention a particularly efficient solution for the handling of material, more particularly for pneumatic pipe transport, is achieved. By using suction, in addition to gravity, to convey the material to be handled from the rotary shaper into the transport pipe, an advantageous solution for a combination of a rotary shaper and pipe transport is achieved. With the guide means according to the invention at the same time an effective infeed of material into the rotary shaper and effective access of replacement air into the rotary shaper are achieved.

BRIEF DESCRIPTION OF THE FIGURES

In the following, the invention will be described in more detail by the aid of an embodiment with reference to the attached drawing, wherein FIGS. 5a-5c present an embodiment of a guide means of the invention from different directions, FIGS. 5d-5f present an embodiment of a guide means of the invention from different directions, FIGS. 5g-5i further present one embodiment of a guide means of the invention from different directions.

DETAILED DESCRIPTION OF THE INVENTION

Figure 1:
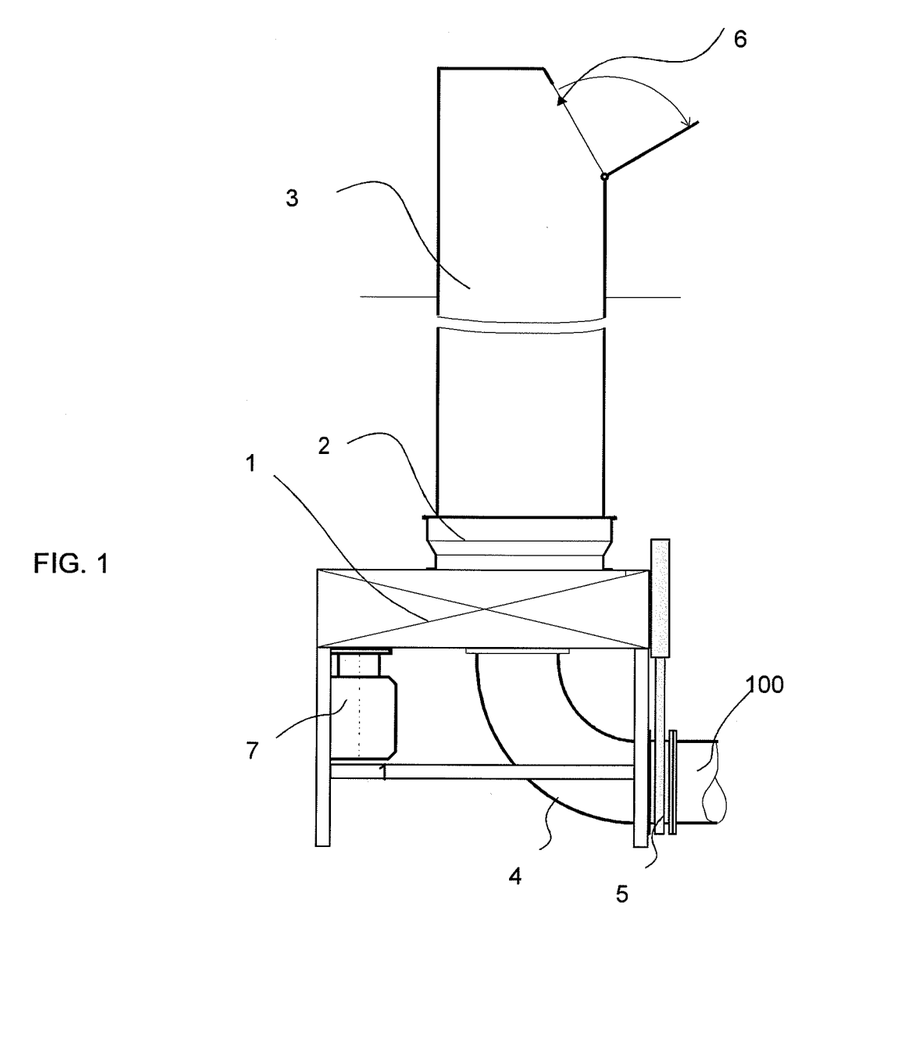
FIG. 1 presents an object of an apparatus according to the invention.

FIG. 1 presents one simplified embodiment of the solution according to the invention, in which a feeder channel 2 is arranged in a rotary shaper device 1, into which feeder channel material is conducted via the input aperture 6 along the channel 3, such as from an input chute, refuse chute or corresponding. The feeder channel 2 is e.g. a tubular part, inside the wall of which remains space for the material w to be fed in. The material w, such as household waste or other waste packed into bags, is fed, e.g. from an input aperture 6 of an input point, into the channel part 3 and from there onwards, via the feeder channel 2, into the rotary shaper 1. An openable and closable hatch, which is open in the situation of the figure, is in connection with the input aperture 6 in FIG. 1. An input point, its channel 3 and feeder channel 2 are in their dimensions, in their cross-sectional area, such that the material w, more particularly waste packed into bags, to be fed in fits into them side by side and one above the other. The material w to be handled arranges, and if necessary is shaped and compacted, in the rotary shaper, and after handling the material is conducted via an output channel 4 into conveying piping 100 e.g. by means of gravity and/or by means of the suction and/or a pressure difference produced by e.g. the drive devices (not presented) of a pneumatic pipe transport system. One advantage of the embodiment of the invention is that the material w can be suitably arranged and be of such a shape that it can be fed in via the output aperture and fits in the transport piping 4, 100 for conveying. In this case conveying piping 100 that is significantly smaller in diameter than usual can be used. According to one embodiment a pipe with a diameter in the region of 150-300 mm, preferably in the region of 200 mm, can be used as a conveying pipe 100. In the embodiment of the invention simultaneous suction can be used, in which case the material to be handled can be acted upon with suction or with a pressure difference acting via the conveying pipe 100 and the output coupling 4 when conducting the material through the aperture of at least one rotatable handling means 10 of the rotary shaper 1. The handling means 10 is rim-like, e.g. ring-shaped, which handling means comprises an aperture from the first side of the handling means, from the inlet side, to the other side, to the outlet side. The handling means 10 is rotated in the embodiment of the figure around the vertical axis with the drive device 7. In one embodiment of the invention the aperture of a handling means is arranged eccentrically with respect to the axis of rotation of the handling means 10. Below the rotary shaper 1 in the output channel 4 is a valve means 5. The valve means 5 opens and closes the connection between the rotary shaper 1 and the conveying pipe 100. With the valve means 5 the infeed of material into the conveying pipe 100, and possibly also the suction effect achieved by the partial-vacuum generator of the pneumatic waste-transporting system from the conveying pipe 100 to the rotary shaper 1, is adjusted.

Guide means 20, 30, 40 extending inwards in the channel from the wall of the channel are arranged in the feeder channel 2 or in the channel 3 leading into it, which guide means are configured to reduce the undesirable rotation of material in the channel 2, 3, and/or to improve the access of replacement air into the rotary shaper via the feeder channel 2.

Figures 2A, 2B, 2C, 2D, 2E:
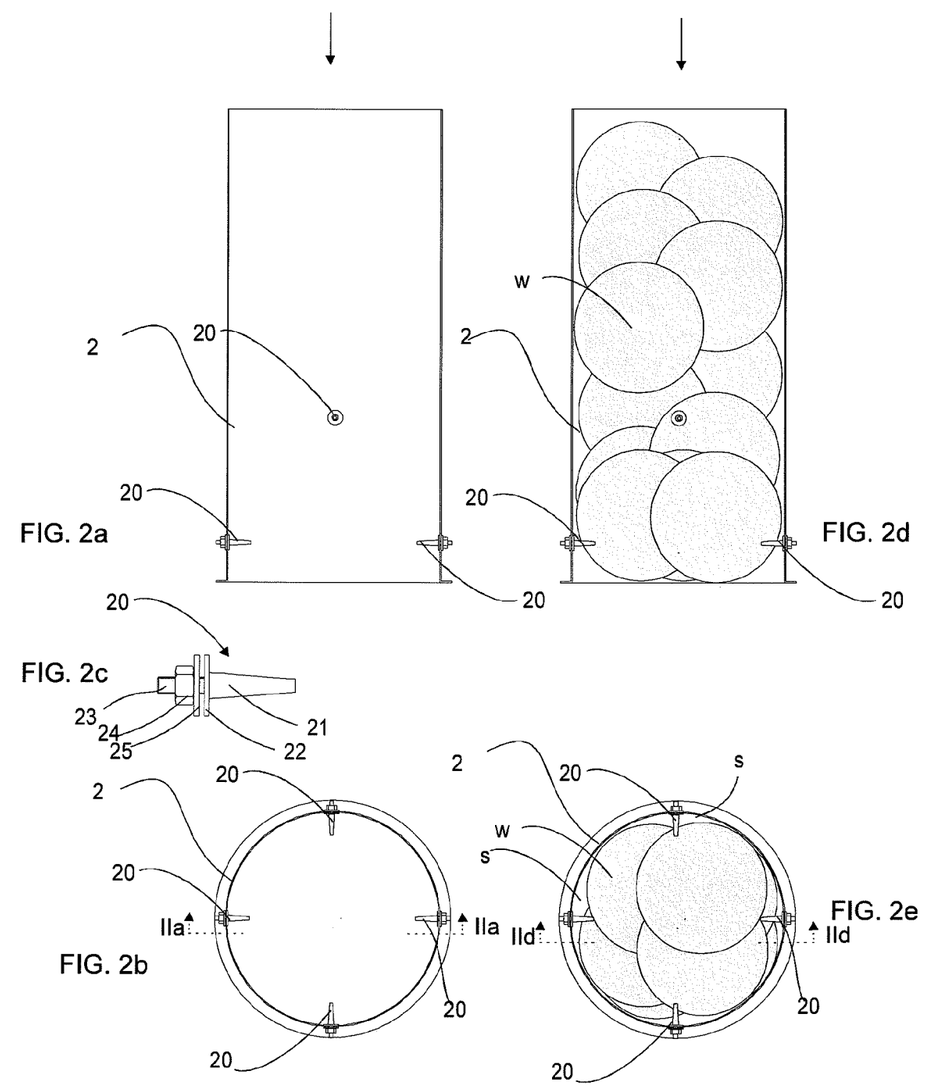
FIG. 2a presents a simplified side view of a detail of an embodiment of a detail of a device according to the invention as a cross-section along the line IIa-IIa of FIG. 2b.
FIG. 2b presents an embodiment of a detail of the device of FIG. 2a from the material infeed direction.
FIG. 2c presents an embodiment of a guide means of the invention.
FIG. 2d presents an embodiment of the device of FIG. 2a in an operating situation, partially sectioned along the line IId-IId of FIG. 2e.
FIG. 2e presents the situation of FIG. 2d from the material infeed direction.
Figure 3A:
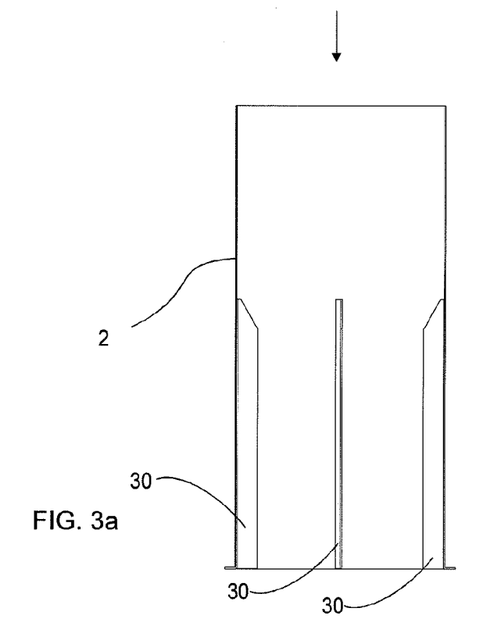
FIG. 3a presents a simplified side view of an embodiment of a detail of a device according to the invention as a cross-section along the line IIIa-IIIa of FIG. 3b.
Figures 3B, 3D:
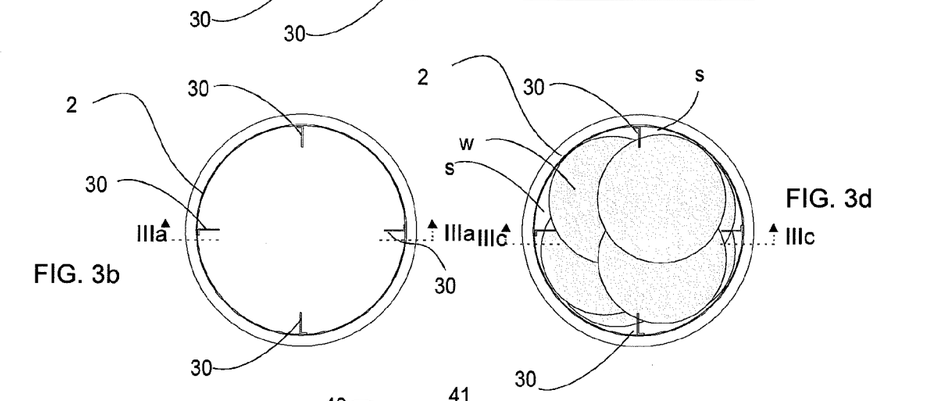
FIG. 3b presents an embodiment of a device of FIG. 3a from the material infeed direction.
FIG. 3d presents the situation of FIG. 3c from the material infeed direction.
Figure 3C:
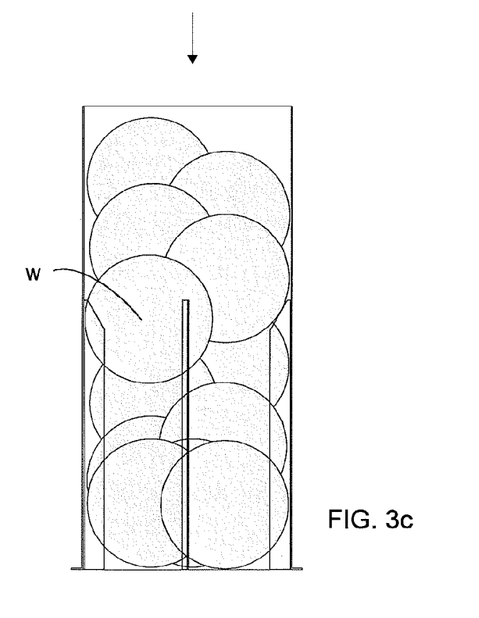
FIG. 3c presents an embodiment of the device of FIG. 3a in an operating situation, partially sectioned along the line 111c-111c of FIG. 3d.

FIG. 2a presents an embodiment wherein the guide means 20 extending inwards in the feeder channel from the wall of the feeder channel 2 are pin members, the guide part 21 of which extends to inside the feeder channel 2 a distance from the wall of the feeder channel. The guide means 20, such as a pin member (FIG. 2c) comprises means 22, 23, 24, 25 for fixing the guide means to the wall of the feeder channel 2 or of the channel leading into it. In the embodiment of the figure an aperture is formed in the wall of the feeder channel 2, from which the fixing section 23 of the guide means 20, such as of a pin member, is led through the wall. In the embodiment of the figure the guide means 20 has a flange section 22, which comes against the wall of the channel and the guide means is tightened into its position from the other side of the wall, e.g. with a nut 24 and a washer 25 fitted onto the fixing section 23. In this case the wall of the feeder channel 2 remains between the flange part 22 of the guide means 20 and the washer 25 of the fixing part, tightened by the nut 24, and the guide means 20 is fixed to the wall. In FIGS. 2a, 2b a number of guide means 20 are arranged in the wall of the input chute 2. The guide means 20 can be arranged in the wall of the channel at different heights and at the desired points on the rim of the feeder channel 2 or of the channel leading into it. The guide means 20 reduce the undesirable rotation of material in the feeder channel, at the same time at the point of the guide means and in its proximity an empty space s preferably forms between the wall of the feeder channel and the material w that is possibly there. This empty space s preferably forms a pathway for replacement air to be conducted through the feeder channel 2, and possibly through the channel connected to it, preferably right up to the rotary shaper 1.

FIGS. 3a-3d present a second embodiment of the invention of guide means 30 extending inwards in the feeder channel from the wall of the feeder channel 2, or of the channel 3 connected to it, which guide means are configured to reduce the undesirable rotation of the material of the feeder channel, and/or possibly to improve the access of replacement air into the rotary shaper via the feeder channel 2 and the channel 3 possibly connected to it. In the embodiment of the figure the guide means 30 are batten members or rib members, which have a guide wall 31, which extends to some extent inside the feeder channel, or inside the channel connected to it, in the transverse direction of the channel. The guide means 30, such as a batten member or rib member, extends a length in the channel in the direction of travel of the feeder channel 2 or of the channel connected to it. In the embodiment of the figure the guide means is arranged in the bottom part of the channel in the proximity of the rotary shaper. In the embodiment of the figure the guide means extends in the channel upwards from the rotary shaper. The guide means 30, such as a batten member or rib member, can be shaped to what is desired according to the embodiment. The guide means 30 can have bevels or it can be bent, in which case it can at the same time guide the passage of the material to be fed in or of the replacement air in the feeder channel. The cross-sectional area of the top end of the guide means is configured in such a way that the guide means does not prevent transfer of the material w in the feeder channel or in the channel leading downwards into it.

In one embodiment the guide means is configured to function as a support for the structure above it, e.g. for the channel part 3 leading into the feeder channel 2.

Figure 4:
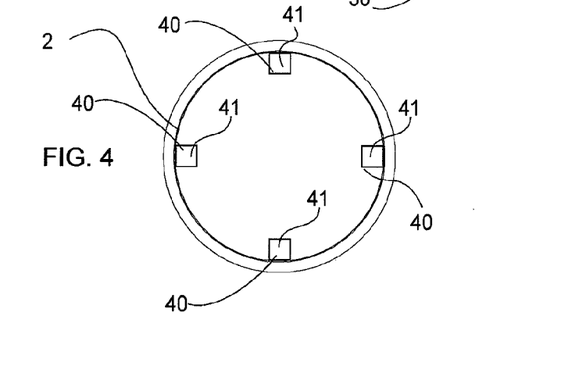
FIG. 4 presents an embodiment of a detail of a device according to the invention from the material infeed direction.

FIG. 4 presents a third embodiment of guide means 40 extending inwards in the channel from the wall of the feeder channel 2, or of the channel 3 leading into it, in which guide means a channel 41 has been formed in the guide means 40 for conducting replacement air to the rotary shaper in the feeder channel 2. By means of the channel 41 formed in the guide means it can be ensured that replacement air is able to travel in the channel 41 of the guide means 40 to the rotary shaper without the material w in the feeder channel 2 hampering the infeed of the replacement air. In the embodiment of FIG. 4 the shape of the guide means 40 is a rectangular profile tube in its cross-section, but the guide means 40 can be formed into the shape desired to be according to the requirements of the application.

Figures 5A, 5B, 5C, 5D, 5E, 5F, 5G, 5H, 5I:
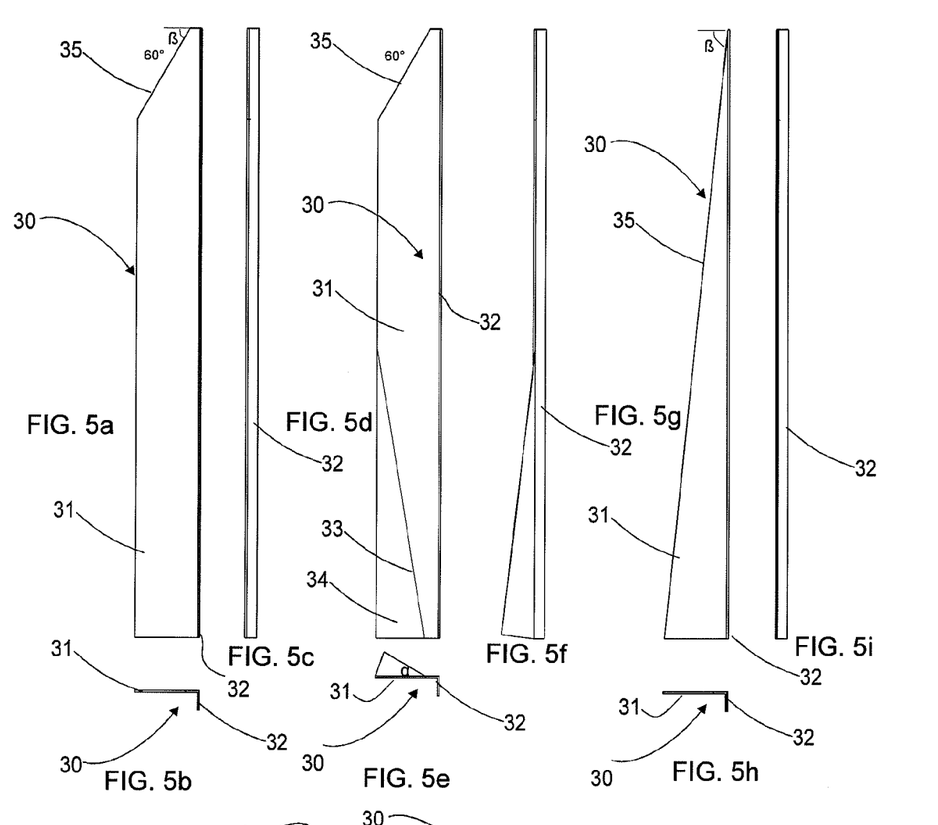

FIGS. 5a-c present various examples of the shapes of guide means 30, such as of a batten member or rib member.

In FIG. 5a a bevel is formed in the top end of the guide means 30, such as of a batten member or rib member, i.e. the top part 35 of the wall of the batten member or rib member is formed to be inclined at an angle of β (beta). In the embodiment of the figures the guide means 30, such as a batten member or rib member, is L-shaped in its cross-sectional shape, in which the fixing section 32 of the guide means, such as a batten member or rib member, typically forms a 90-degree angle from the wall 31 of the batten member or rib member extending into the input chute. A guide means, such as a batten member or rib member, can be fixed to the wall of the feeder channel 2 e.g. with fixing means, such as with screws or rivets, or by welding, brazing or glueing.

FIGS. 5d-f present an embodiment of a guide means 30, such as a batten member or rib member, wherein the wall 31 of the member, said wall extending into the feeder channel, is bent. The bend can be formed according to the application. According to one embodiment the bending direction is arranged in the main infeed direction of the rotary shaper. In FIGS. 5d-f a bent section 34 is arranged in the bottom part of the guide wall 31 of the guide means, such as of a batten member or rib member, in which section the wall is bent along a bending line 33 at an angle of α (alfa) The bending angle can vary according to the application. According to one embodiment the angle α (alpha) on between 5-45 degrees. In the embodiment of the figure the bending angle α (alpha) is e.g. approx. 30 degrees.

FIGS. 5g-i present yet another embodiment, wherein a bevel is formed in the guide means 30, such as in the batten member or rib member, i.e. the top part 35 of the wall of the guide means 30, such as of a batten member or rib member, is formed to be inclined at an angle of β (beta). The inclination can be formed to be that desired. According to one embodiment the angle is between 30-80 degrees. In the embodiment of the figure the angle β (beta) is 60 degrees.

Figure 6:
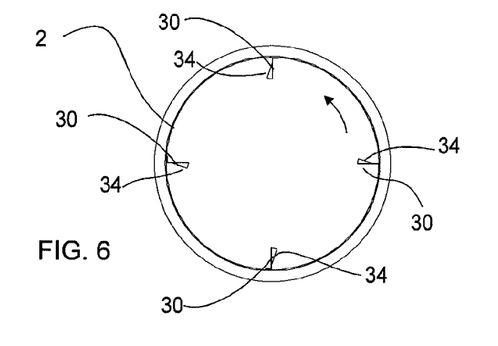
FIG. 6 presents an embodiment of a detail of a device according to the invention from the material infeed direction.

FIG. 6 presents a cross-section of a feeder channel 2, in which are arranged guide means 30, in the guide wall 31 of which a bent section 34 is arranged. The guide wall 31 can be bent fully or only partly. According to one embodiment the guide wall 31 is bent in the main infeed direction of the rotary shaper, e.g. in the figure counterclockwise. In this case the material to be handled can be guided with the guide means 30 in the feeder channel 2 in the manner desired, e.g. to displace towards the center part, in the cross-section direction of the figure.

Figures 7, 7A, 7B:
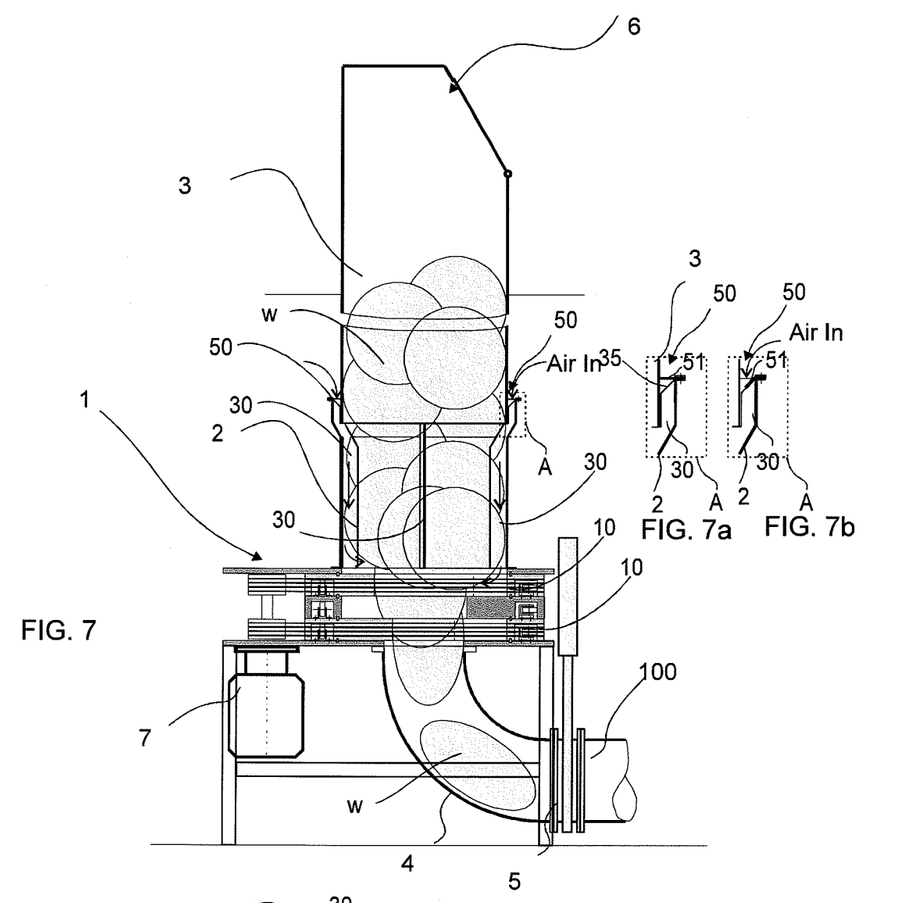
FIG. 7 presents one embodiment of a device according to the invention.
FIG. 7a presents a detail A from FIG. 7, in a first operating mode.
FIG. 7b presents the detail A from FIG. 7, in a second operating mode.

FIG. 7 illustrates another embodiment of the invention, in which guide means 30 are arranged in the feeder channel 2, and in addition an input aperture 50 for replacement air is arranged in the feeder channel. In FIG. 7 material w has been fed into an input point, such as into an input chute 2, from an input aperture 6. The material w is described in the figures with balls, but it can be material of many types and shapes, such as e.g. household waste or other waste packed into bags. The input aperture 6 is closed with a hatch in the situation of the figure. An expansion is formed in the top end of the feeder channel 2, in which expansion an input aperture 50 for replacement air is formed. Replacement air is able to travel from the replacement-air aperture 50 between the expansion and the bottom part of the upstream channel 3 connected to the feeder channel 2. The replacement-air aperture 50 is arranged to the outside of the bottom part of the channel 3 coming from the input point. FIGS. 7a and 7b present point A of FIG. 7 magnified and in more detail. A valve means 51, which in the embodiment of the figure is a flap means, such as a rubber flap, is arranged in connection with the replacement-air aperture 50. The valve means 51 is arranged to be attached at its second edge to the edge of the expansion of the top part of the feeder channel. In FIG. 7a, the valve means 51 arranged in connection with the replacement-air aperture is in a position in which the replacement-air aperture is closed. In this case the inside edge of the flap means functioning as a valve means is against the outer surface of the wall of the channel 3. In FIG. 7b, the valve means 51 arranged in connection with the replacement-air aperture is in a second position, in which the replacement-air aperture 50 is open and replacement air is able to enter the channel 2. The valve means 51 opens when the input aperture of the input point is closed and suction is switched on to act from the piping 100 in the rotary shaper 1. The valve means 51 of the replacement air valve 50 bends from the force of the suction/pressure difference and lets replacement air into the feeder channel 2 from the replacement-air aperture. With the properties of the valve means 51 e.g. the pressure can be adjusted. When the valve means 51 is a flap means, it is possible to influence with the stiffness of the flap, e.g. with its thickness, at what pressure and by how much the replacement air valve opens. The movement of the replacement air is described in the figure with arrows. In the embodiment of the figure the valve means has a restrictor means, which restricts the amount of movement of the flap of the valve means 51. In the embodiment of the figure the restrictor means is formed from the top part 35 of the guide means 30, which top part is configured to extend into the proximity of the replacement-air aperture 50 from the channel 2. The restrictor means can also be a restrictor means 52 (FIG. 9b) that is separate from the guide means 30, which restrictor means is arranged in the proximity of the replacement-air aperture 50. The valve means 51 returns to the closing position when the suction decreases and ends. When the valve means is closed, the access of e.g. smells from the replacement-air aperture 50 to outside the channel is prevented. The valve means 51 is thus arranged as a non-return valve, which prevents opening outwards, i.e., upwards in the figure, but allows the access of replacement air to inside the channel 2.

The material w to be handled is fed in from the feeder channel 2 into the shaper device 1 and is handled with the shaping means 10 of the shaping device 1 to fit into the conveying pipe 100 of the pneumatic transport system.

Figure 8:
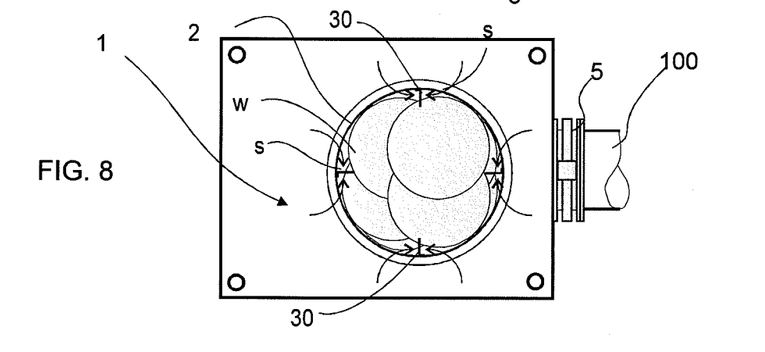
FIG. 8 presents the device of FIG. 7, partially sectioned, as viewed from the material infeed direction.

FIG. 8 illustrates the air gap s to be formed in the proximity of the guide means 30, from which air gap replacement air is conducted to the rotary shaper 1 in the feeder channel 2. FIG. 8 presents the situation of FIG. 7 from the direction of the feeder channel 2. The material w in the feeder channel 2 is presented as grey. An empty space 3, i.e. an air gap, via which replacement air gains access to the shaper device 1, is formed in the proximity of the guide means 30.

Figure 9:
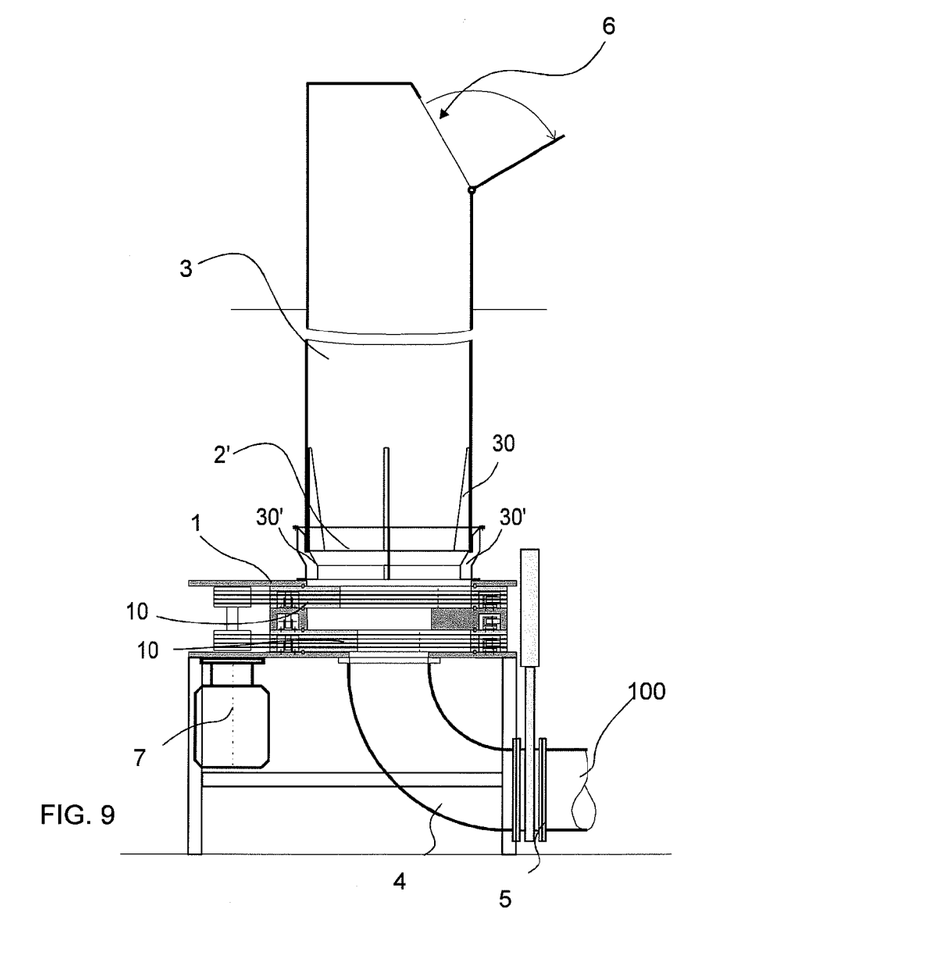
FIG. 9 presents one embodiment of a device according to the invention, partially sectioned.
Figure 9A:
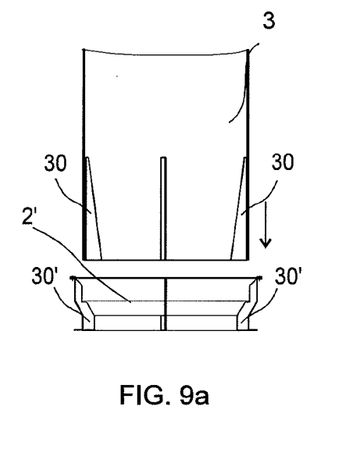
FIG. 9a presents a detail of an embodiment of a device according to the invention, with some of the parts separated from each other for the sake of clarity.

In the embodiment of FIG. 9, the guide means are formed in the feeder channel, which is formed from the channel part 3 of the input chute or input point and from a relatively short feeder channel 2' situated near the rotary shaper. An expansion is formed in the feeder channel 2', in the top end of it, in which expansion a replacement-air aperture 50 is formed. Replacement air is able to travel from the replacement-air aperture 50 between the expansion and the bottom part of the upstream channel 3 connected to the feeder channel 2'. According to the embodiment the guide means 30, 30' can be formed in the actual feeder channel and/or in the channel part of the input chute and/or input point to be connected to the feeder channel. The guide means 30, 30' according to FIGS. 9 and 9a are arranged in the channel part 3 and in the feeder channel 2' that is below it and before the shaper device 1. The placement of the guide means 30, 30' in relation to each other in the channel part 3 and in the feeder channel 2' can be selected according to the application. The guide means 30, 30' disposed in the different channel parts 3, 2' in FIGS. 9 and 9a are essentially face-to-face. The guide means 30 of the upstream channel part 3 and the guide means 30' of the feeder channel 2' do not need to be face-to-face, but instead they can be arranged according to the requirements of the application. In FIG. 9a the feeder channel 2' and the channel part 3 upstream of it are presented at a distance from each other for the sake of clarity.

Figure 9B:
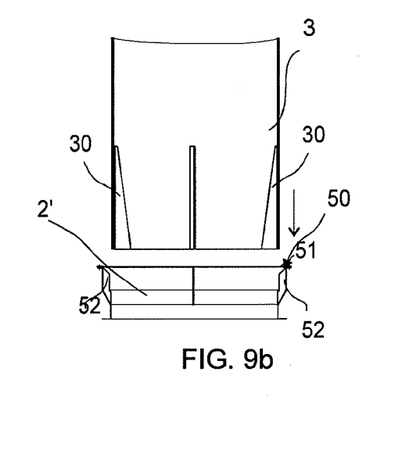
FIG. 9b presents a detail of an embodiment of the device according to the invention, with some of the parts detached from each other for the sake of clarity.

FIG. 9b presents an embodiment in which the guide means 30 are arranged in the channel part 3 upstream of the feeder channel and in the short feeder channel 2' there is only the restrictor means 52 of the valve means 51, and no guide means. This has been proven to give sufficient effect according to the invention.

Figures 10, 10A:
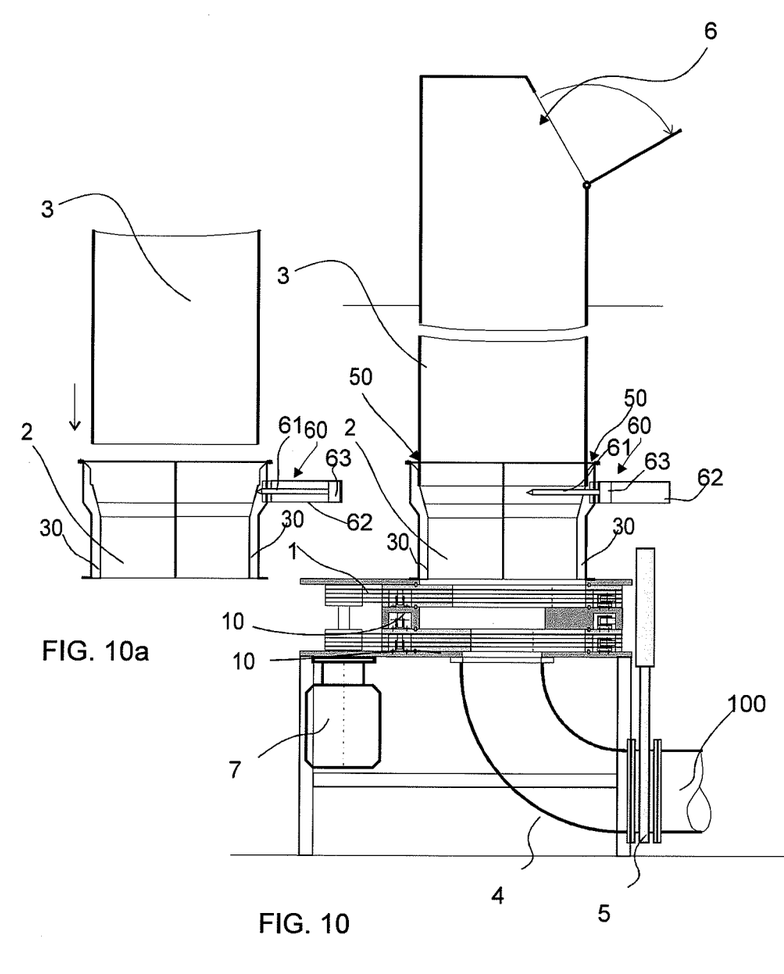
FIG. 10 presents one embodiment of a device according to the invention, partially sectioned.
FIG. 10a presents a detail of an embodiment of a device according to the invention, with some of the parts detached from each other for the sake of clarity.

FIG. 10 presents yet another embodiment of the invention. According to the embodiment of the invention, an arresting device 60 is arranged in the feeder channel 2 or in the channel part 3 preceding the feeder channel before the rotary shaper 1 in the conveying direction of the material w. The arrester device comprises an arrester means 61 and its drive device 62. The arresting means 61 can be moved between at least two positions, a first position, in which the arresting means extends from the edge of the wall of the feeder channel 2, or of the channel 3 leading into it, a distance into the feeder channel (in FIG. 10), preferably essentially across the feeder channel 2 or the channel 3 leading into it in the transverse direction with respect to the direction of travel of its material, and a second position (FIG. 10a), in which the arresting means 61 does not extend into the feeder channel.

In the first position, i.e. in the active position, the arresting means 61 receives at least some of the force effect produced by the material w that has collected in the input chute, or in a corresponding feeder channel before it in the material infeed direction, and/or prevents the access of some of the material into the rotary shaper. In this case the load produced by the material that is in the feeder channel, and is intended for handling, on the rotary shaper, on its handling means 10, decreases. On the other hand, the arresting means 61 can also prevent the material that is in the feeder channel and is between arresting means 61 and the rotary shaper 1 from rising to above the arresting means in the feeder channel when the arresting means is in the first position.

According to one embodiment the arresting means 61 is an elongated rod-shaped part.

According to one embodiment the drive device 62 of the arresting device 60 is a piston-cylinder combination. The arresting means 61 is arranged on the piston rod of the piston 63 of the drive device 62 or the arresting means 61 is formed, at least partly, from piston rod of the drive device 62.

According to one embodiment the arresting means 61 can be of some other shape, e.g. plate-shaped.

According to one embodiment the transverse surface area of the arresting means 61 covers some of the transverse surface area of the feeder channel 2, or of the channel 3 leading into it, in the material infeed direction.

According to one embodiment the drive device 62 of the arresting means is a pressure-medium acting cylinder-piston combination, with the piston part 63 of which the arresting means 61 is configured to be moved.

According to one embodiment the arresting means 61 is, in the first position, configured to limit the amount of material being fed to the rotary shaper device 1.

According to one embodiment the arresting means is arranged in the proximity of the replacement-air aperture 50. According to one embodiment the arresting means 61 is arranged in the feeder channel 2 or in the channel 3 leading into it, in an area in which there are guide means 20, 30, 40. According to one embodiment the arresting means 61 is arranged in the feeder channel 2 or in the channel 3 leading into it, in an area which is in the proximity of the top part of the guide means. According to one embodiment the arresting means 61 is arranged in the feeder channel 2 or in the channel 3 leading into it, in an area which is in the area between the rotary shaper device 1 and the replacement-air aperture 50.

Figure 11:
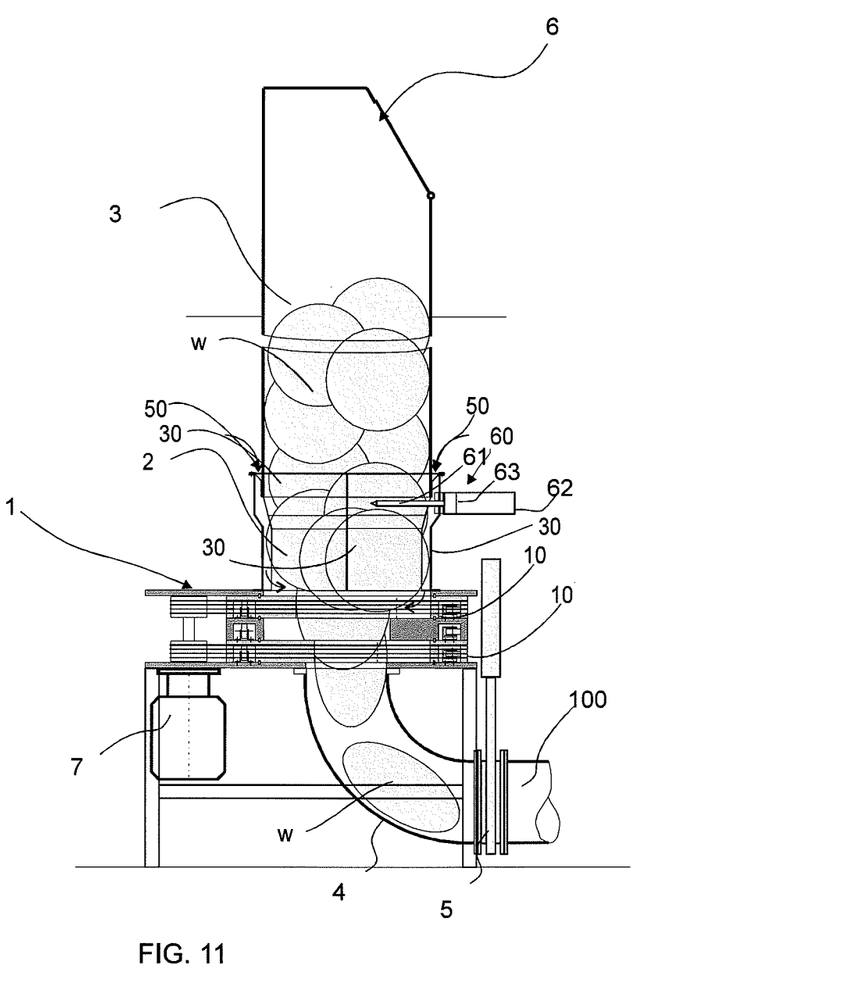
FIG. 11 presents one embodiment of a device according to the invention.

FIG. 11 further presents an embodiment in which the arresting means extends into the feeder channel 2. The load of the material w in the feeder channel 2, or in the channel 3 connecting to it, before the arresting means is received at least partly with the arresting means 61. At the same time the access of replacement air into the feeder channel 2 is facilitated when some of the load is received with the arresting means. In the active position the arresting means 61 receives at least some of the force effect produced by the material w that has collected in the input chute 3, or in a corresponding feeder channel before it in the material infeed direction, and/or prevents the access of some of the material into the rotary shaper. In this case the load produced by the material that is in the feeder channel, and is intended for handling, on the rotary shaper 1, on its handling means 10, decreases and the access of replacement air via the replacement-air aperture to the rotary shaper is facilitated.

Household waste fed as a shaped stream into the conveying pipe is conveyed in the conveying pipe 100 onwards by means of suction and/or a pressure difference to the reception location, such as to a waste station or corresponding.

The general operation of a prior-art rotary shaper is presented e.g. in publications WO8203200, WO2011098666, WO2011098667, WO2011098668 and WO2011098669, and it is not described in more detail in this publication.

The invention thus relates to a method for feeding material into a rotary shaper device in a pneumatic pipe transport system for material, in which the material is conducted along a feeder channel 2 to a rotary shaper device 1, in which case the material w to be handled is conducted into the rotary shaper device and/or through it by the aid of at least partly the suction and/or a pressure difference of the pneumatic pipe transport system. In the method the material w is acted upon in the feeder channel 2 and/or in the channel 3 leading into it with at least one guide means 20, 30, 40, which is configured to reduce the undesirable rotation of the material w in the feeder channel and/or to improve the access of replacement air into the rotary shaper.

According to one embodiment in the method the material is acted upon with a guide means 20, 30, 40, which extends in the feeder channel, or in the channel 3 leading into it, inside the channel a distance from the wall of the channel.

According to one embodiment in the method the material is acted upon with a guide means 20, which is a pin member.

According to one embodiment in the method the material is acted upon with a guide means 30, which is a batten member or rib member.

According to one embodiment in the method the material w is acted upon with a guide means 20, 30, 40 in such a way that a space s forms in the proximity of the guide means 20, 30, 40 between the material w to be handled and the guide means.

According to one embodiment in the method the material w is acted upon with a guide means 40, in which a channel 41 is arranged for conducting replacement air in the channel, preferably to the shaper device 1.

According to one embodiment in the method replacement air is conducted into the channel 2 from the replacement-air aperture 50, which is arranged in the channel in the proximity of the guide means 20, 30, 40.

According to one embodiment in the material infeed direction before the rotary shaper device 1 is a movable arresting means 61, which arresting means has a first position, in which it extends into the feeder channel 2 or into the channel 3 leading into it and in which first position the arresting means 61 receives at least some of the force effect produced by the material w in the feeder channel 2 or in the channel 3 leading into it and in which the transfer of the material w in the feeder channel 2 or in the channel 3 leading into it is limited, if necessary, with the arresting means 61, and which arresting means 61 has a second position, in which the arresting means 61 does not extend into the feeder channel 2 or into the channel 3 leading into it.

According to one embodiment the method is applied in connection with a pneumatic materials handling system, more particularly in connection with a pipe transport system for waste material, wherein waste, most preferably packed into bags, is conveyed from an input point into a separating device, where the waste being transported is separated from the transporting air.

The invention also relates to an apparatus for feeding material into a rotary shaper device 1 in a pneumatic pipe transport system for material, which apparatus comprises a feeder channel 2 leading into a rotary shaper device 1. At least one guide means 20, 30, 40 is arranged in the feeder channel 2 or in the channel 3 leading into it, which guide means extends in the channel inside the channel a distance from the wall of the channel.

According to one embodiment the guide means 20 is a pin member.

According to one embodiment the guide means 30 is a batten member or rib member.

According to one embodiment a channel 41 for conducting replacement air is arranged in the guide means 40.

According to one embodiment the guide means 40 is a pipe member.

According to one embodiment the guide wall 31 of the guide means 30 is aligned towards the center part of the channel in the transverse direction with respect to the direction of travel of the channel.

According to one embodiment the guide wall 31 of the guide means 30, or at least a part of the guide wall, is aligned at an angle α, towards e.g. the main infeed direction of the shaper device 1 and/or the main direction of rotation of the shaping means 10.

According to one embodiment a number of guide means 20, 30, 40 are arranged on the rim of the feeder channel 2 or of the channel 3 leading into it.

According to one embodiment the guide means 20, 30, 40 are arranged distributed on the rim of the feeder channel or of the channel leading into it.

According to one embodiment the reach of the guide wall 31 of the guide means 30 from the wall of the channel towards the inside part of the channel increases in the conveying direction of the material.

According to one embodiment an input aperture 50 for replacement air is arranged in the feeder channel 2, after which and/or before which input aperture a guide means 20, 30, 40 is arranged in the channel.

According to one embodiment a valve means 51, which is preferably a flexible flap, is arranged in the replacement-air aperture 50.

According to one embodiment a movable arresting means 61 is arranged in the material infeed direction before the rotary shaper device 1, that the arresting means has a first position, in which it extends into the feeder channel 2 or into the channel 3 leading into it, in which first position the arresting means 61 receives at least some of the force effect produced by the material w in the feeder channel 2 or in the channel leading into it, and that the transfer of the material w in the feeder channel 2 or in the channel 3 leading into it towards the rotary shaper device 1 is limited, if necessary, with the arresting means 61, and that the arresting means 61 has a second position, in which the arresting means 61 does not extend into the feeder channel 2 or into the channel 3 leading into it, and that the apparatus comprises a drive device 62 for the arresting means for moving the arresting means between the first and the second position.

According to one embodiment the pneumatic pipe transport system for material is a pneumatic pipe transport system for waste material, wherein waste material, such as waste packed into bags, is conveyed from an input point into a separating device, where the waste material to be transported is separated from the transporting air.

Typically the material to be handled is waste material, such as waste material arranged in bags. A refuse chute can be configured to be a part of a pneumatic waste conveying system or it can be a separate part, in which waste material is conducted into a waste room, waste tank or corresponding.

It is obvious to the person skilled in the art that the invention is not limited to the embodiments presented above, but that it can be varied within the scope of the claims presented below. The characteristic features possibly presented in the description in conjunction with other characteristic features can if necessary be used separately to each other.

The invention claimed is:

1. A method for feeding material into a rotary shaper in a pneumatic pipe transport system for material, in which the material is conducted along a feeder channel to the rotary shaper, in which case the material to be handled is conducted into the rotary shaper and/or through the rotary shaper by the aid of at least partly the suction and/or a pressure difference of the pneumatic pipe transport system, comprising the following steps:
   acting upon the material in the feeder channel with at least one guide;
   configuring the at least one guide to reduce the undesirable rotation of the material in the feeder channel and/or to improve the access of replacement air into the rotary shaper; and
   extending the at least one guide in the feeder channel a distance from a wall of the feeder channel.

2. The method according to claim 1, wherein the at least one guide is a pin member.

3. The method according to claim 1, wherein the at least one guide is a batten member or rib member.

4. The method according to claim 1, wherein a space forms in the proximity of the at least one guide between the material to be handled and the wall of the feeder channel.

5. The method according to claim 1, wherein replacement air is introduced into the feeder channel.

6. The method according to claim 1, wherein replacement air is conducted into the feeder channel from a replacement-air aperture, which is arranged in the feeder channel in the proximity of the at least one guide.

7. The method according to claim 1, further comprising a movable arrestor in the feeder channel, the arrestor having a first position, in which the arrestor extends into the feeder channel or wherein the arrestor receives at least some of the force produced by the material in the feeder channel and in which the transfer of the material in the feeder channel is limited, and the arrestor having a second position, in which the arrestor does not extend into the feeder channel.

8. The method according to claim 1, further comprising providing waste packed into bags is provided to the rotary shaper.

9. The method according to claim 1, wherein the at least one guide extends in an axial direction of the feeder channel.

10. An apparatus for feeding material into a rotary shaper in a pneumatic pipe transport system for material, comprising:
    a feeder channel leading into the rotary shaper device;
    at least one guide arranged in the feeder channel, said at least one guide extending inside the feeder channel a distance from the wall of the feeder channel; and
    wherein the at least one guide is configured to reduce the undesirable rotation of the material in the feeder channel and/or to improve the access of replacement air into the rotary shaper.

11. The apparatus according to claim 10, wherein the at least one guide is a pin member.

12. The apparatus according to claim 10, wherein the at least one guide is a batten member or rib member.

13. The apparatus according to claim 10, wherein a channel for conducting replacement air is arranged in the at least one guide.

14. The apparatus according to claim 10, wherein the at least one guide is a pipe member.

15. The apparatus according to claim 10, wherein a guide wall of the at least one guide is aligned towards a center part of the feeder channel in the transverse direction with respect to the direction of travel of the feeder channel.

16. The apparatus according to claim 15, wherein the guide wall of the at least one guide, or at least a part of the guide wall, is aligned at an angle, towards the main infeed direction of the rotary shaper and/or the main direction of rotation of the rotary shaper.

17. The apparatus according to claim 10, wherein a plurality of guides is arranged on a rim of the feeder channel.

18. The apparatus according to claim 10, wherein the at least one guide is on a rim of the feeder channel.

19. The apparatus according to claim 10, wherein the at least one guide tapers in an axial direction of the feeder channel, and wherein the at least one guide is larger in a downstream direction of the feeder channel.

20. The apparatus according to claim 10, wherein an input aperture for replacement air is arranged in the feeder channel.

21. The apparatus according to claim 20, wherein a valve is arranged in the input aperture.

22. The apparatus according to claim 10, wherein a movable arrestor is arranged in the feeder channel, the arrestor having a first position, in which the arrestor extends into the feeder channel and receives at least some of the force effect produced by the material in the feeder channel, and in that the transfer of the material in the feeder channel towards the rotary shaper is limited, and a second position, in which the arrestor does not extend into the feeder channel, and a driver for moving the arrestor between the first position and the second position.

23. The apparatus according to claim 10, wherein the at least one guide extends in an axial direction of the feeder channel.

\* \* \* \* \*